Patented July 10, 1923.

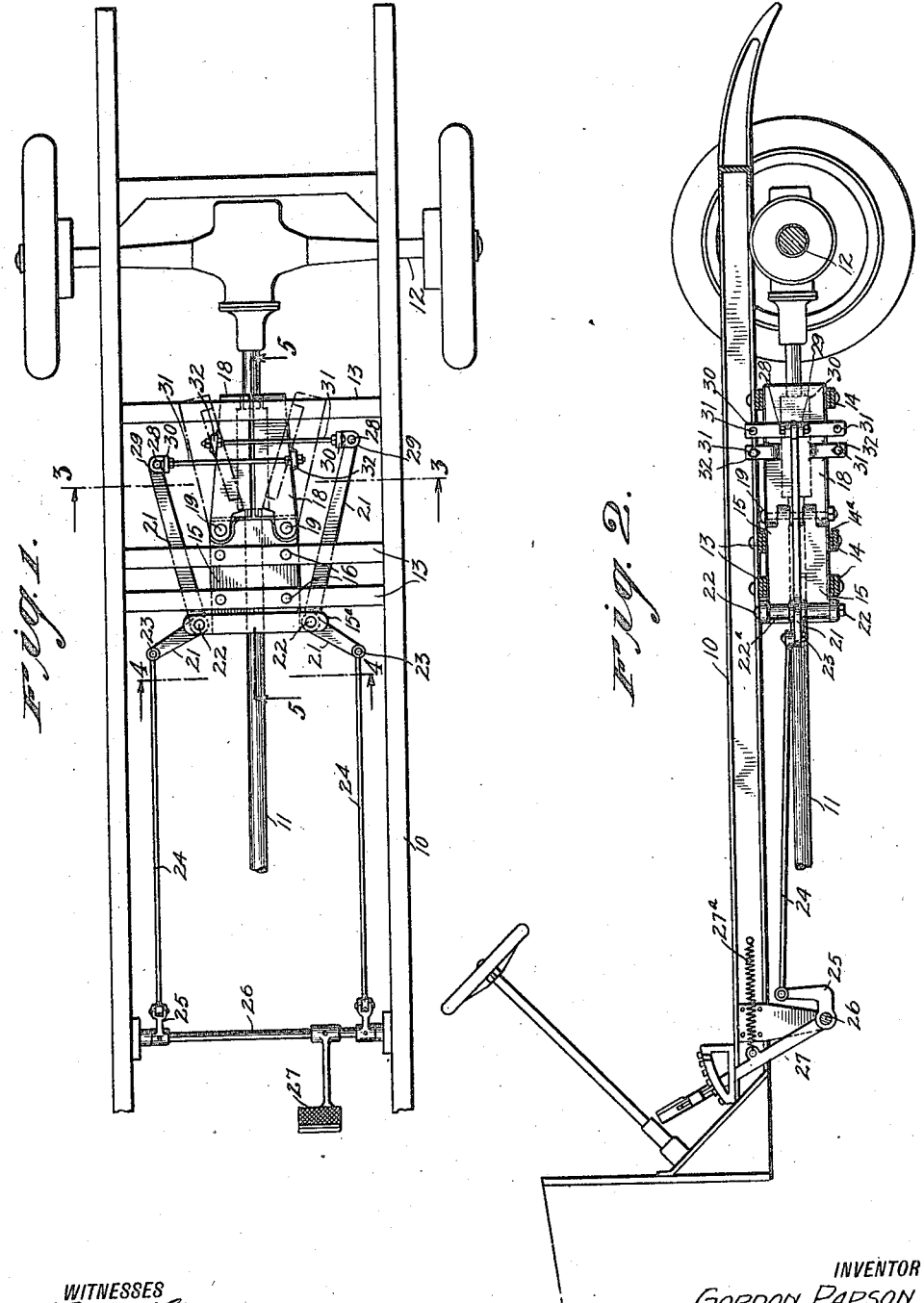

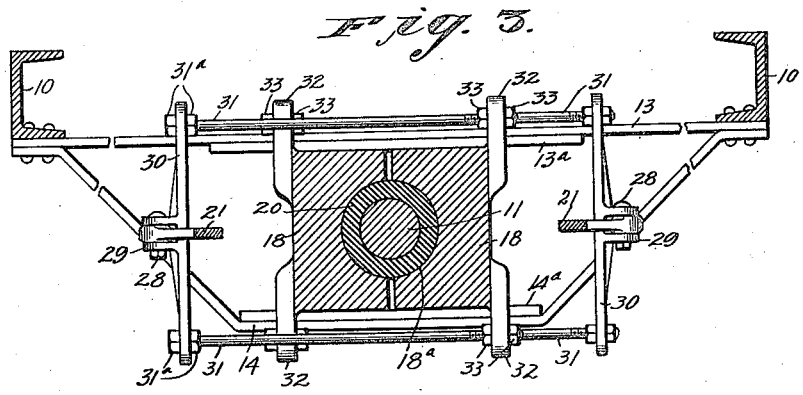
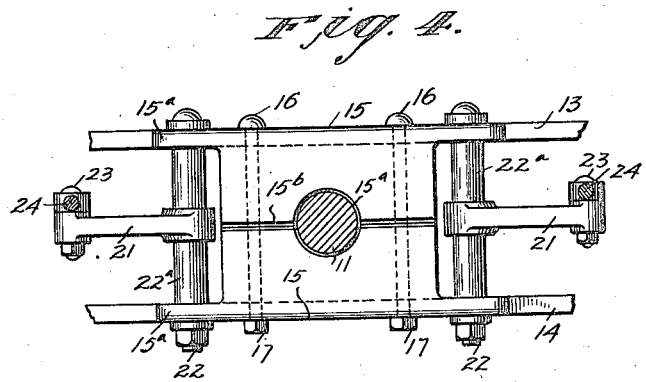
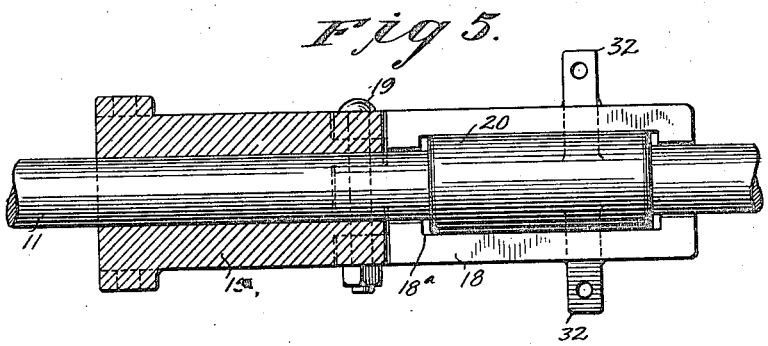

1,461,674

UNITED STATES PATENT OFFICE.

GORDON PARSON, OF PLAINFIELD, NEW JERSEY.

AUTOMOBILE BRAKE.

Application filed July 9, 1921. Serial No. 483,615.

*To all whom it may concern:*

Be it known that I, GORDON PARSON, a citizen of the United States, and a resident of Plainfield, in the county of Union and State of New Jersey, have invented a new and Improved Automobile Brake, of which the following is a description.

My invention relates to a brake for motor-driven vehicles and more particularly to a brake having brake shoes movable into and out of braking contact with the transmission shaft.

The nature of the invention, its distinctive features, and its advantages will clearly appear from the specific description following.

Reference is to be had to the accompanying drawings forming a part of this specification, it being understood that the drawings are merely illustrative of one example of the invention.

Figure 1 is a plan view of a portion of a chassis of a motor-driven vehicle with my improved brake applied thereto;

Figure 2 is a longitudinal vertical section;

Figure 3 is a transverse vertical section on an enlarged scale on the line 3—3, Figure 1;

Figure 4 is an enlarged transverse vertical section on the line 4—4, Figure 1;

Figure 5 is a detail view in longitudinal vertical section on the line 5—5, Figure 1.

In the illustrated example the numeral 10 represents portions of a frame of a motor-driven vehicle; 11, the transmission shaft; 12 indicates the rear axle. Fixed cross frame members are provided comprising top bars 13 having reinforcing bars 13ª beneath the same and hanger bars 14 extending below the top bars and reinforced bars 14ª at the upper surfaces of said bars 14.

In the frame composed of the bars 13, 14, I provide upper and lower block sections 15 presenting opposed semi-circular depressions 15ª to jointly accommodate the shaft 11 passing freely through said block sections. The horizontal opposed faces 15ᵇ of said block sections 15 come together as at 15ᵈ so as to prevent binding action on the shaft 11. Vertical bolts 16 and nuts 17 serve to secure the block sections to the frame bars 13 and 14. The sectional block 15 serves to pivotally support laterally swingable brake shoes 18 pivoted by bolts 19 or the like to the front end of the sectional block 15 and said brake shoes present opposed concavities 18ª at their inner faces to have braking contact with the shaft 11; preferably said shaft 11 is given an enlarged diameter by reason of a sleeve or elongated fixed collar 20 shrunk on the shaft or otherwise rigidly secured thereto to present an ample surface to the brake shoes.

The brake shoes 18 are respectively connected in a manner hereinafter described, to brake levers 21 of bell-crank form, the forward short arms of which are secured as by bolts 23 to brake rods 24 extending forwardly. Suitable means is provided for operating the brake rods, there being shown for the purpose elbow-shaped arms 25 made rigid with the transverse brake shaft 26 having a pedal 27 secured thereto, so that a depression of the pedal will rock the brake levers 21. The rear longer arms of the brake levers 21 have their rear ends secured as by bolts 28 between lugs 29 on upright bars 30 disposed laterally outward from the brake shoes 18, there being one of said upright bars 30 at each side of the brake. Each bar 30 is connected at the top and bottom with a brake shoe 18 to swing the same on its pivot 19, the illustrated means for the purpose consisting of transverse tie rods 31 above and below the brake shoes, there being a pair of rods for each brake shoe. Thus, one tie rod 31 is secured at one end to the upper end of upright bar 30 by nuts 31ª at opposite sides of said upright bar; and the opposite end of said rod is secured to upstanding lugs 33 of that brake shoe 18 at the opposite side of the shaft 11; and a second tie rod 31 is secured to the lower end of an upright bar 30 by nuts 31ª and is secured to depending lugs 32ª on the said shoe 18 at the opposite side of the shaft. Thereby, the rocking of the levers 31 at the respective sides of the brake serves, through the medium of the tie rods 31, to operate the shoe at the opposite side of the shaft.

For rockably mounting the brake lever 31 vertical bolts 22 are provided extending through upper and lower alined lugs 15ª on the sectional block 15 at the sides, the said lever at the angle having rigid therewith a sleeve 22ª extending between the upper and lower lugs 15ª about the bolts 22.

From the foregoing it will be seen that a depression of the lever 27 will act through shaft 26, arms 25, and brake rod 24 to rock the levers 21 in a manner to draw the brake shoes 18 laterally inward into braking contact with the shaft 11 at the enlargement 20 thereof. A spring 27ª secured to the pedal 27 and to one of the frame bars 10 raises the pedal 27 when the operator relieves the pressure on the pedal and thereby releases the brake by swinging the shoes 18 laterally outward.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. A brake for motor-driven vehicles, including a pair of brake shoes, means to swingably mount said brake shoes at opposite sides of the transmission shaft of the vehicle and permit a movement of the same in a plane containing the axis of said shaft, operating levers laterally outward from said brake shoes, and tie rods connecting each of said levers with the brake shoes at the opposite side; together with means to actuate said levers.

2. A brake for motor-driven vehicles, including a sectional block affording a free passage between the sections for the transmission shaft of the vehicle, means to rigidly secure said sectional block in position on the vehicle with the sections respectively above and below the transmission shaft, brake shoes swingably mounted on said sectional block by vertical pivots and spaced to accommodate the transmission shaft therebetween, said shoes moving on said shaft in a plane containing the axis of the shaft and means for swinging said brake shoes into or out of braking engagement with said shaft.

3. The combination with a transmission shaft of a motor-driven vehicle, of brake shoes at opposite sides of the said shaft and swingably mounted for movement to or from braking engagement with said shaft in a plane containing the axis of the shaft, and means to operate said brake shoes, said shaft having an increased diameter adjacent to said shoes to present ample surface to the latter.

4. The combination with a motor-driven vehicle, of a transverse frame rigid with the side bars of the vehicle and presenting upper and lower frame members, and a brake mounted between said upper and lower frame members, said brake including a block rigid with said transverse frame members, and affording free passage for the transmission shaft, and brake shoes swingably mounted on said block into and out of braking engagement with said shaft; together with means to operate said brake shoes moving the shoes in a plane containing the axis of the shaft.

5. A brake for vehicles, including a shaft, a block surrounding the shaft, a pair of brake shoes pivotally mounted at one of their ends to said block and moving toward or from said shaft on said pivoted ends.

6. A brake for motor-driven vehicles, comprising brake shoes, means to swingably mount the shoes disposed at opposite sides of the transmission shaft of the vehicle, said shoes being swingable in a plane containing the axis of said shaft, and means to operate said shoes also swingably mounted in said first-mentioned means.

7. A brake for motor-driven vehicles, comprising a supporting block, a pair of brake shoes pivotally mounted on said block at one end thereof, said shoes being swingable in a plane containing the axis of the shaft, and operating means for each brake shoe pivotally mounted to said block at the opposite end thereof.

GORDON PARSON